United States Patent [19]

Hoogstad

[11] Patent Number: 5,198,259
[45] Date of Patent: Mar. 30, 1993

[54] CONCENTRATED TEA EXTRACT

[75] Inventor: Bruin Hoogstad, Bedford, United Kingdom

[73] Assignee: Thomas J. Lipton, Inc., Englewood Cliffs, N.J.

[21] Appl. No.: 312,330

[22] Filed: Feb. 16, 1989

Related U.S. Application Data

[63] Continuation of Ser. No. 120,518, Nov. 13, 1987, abandoned.

[30] Foreign Application Priority Data

Nov. 14, 1986 [GB] United Kingdom ............... 8627290

[51] Int. Cl.$^5$ ................................................ A23F 3/22
[52] U.S. Cl. .................................. 426/435; 426/388; 426/597
[58] Field of Search ........................ 426/597, 435, 388

[56] References Cited

U.S. PATENT DOCUMENTS 4,534,985 8/1985 Gasau ............................. 426/435 X

FOREIGN PATENT DOCUMENTS 0133772 3/1985 European Pat. Off. ............ 426/597
559758 3/1944 United Kingdom ................ 426/597

OTHER PUBLICATIONS

Punnett, What Causes, 'Clouding' in Ice Tea?, Tea and Coffee Trade Journal, May 1956, pp. 17, 86, 87.

*Primary Examiner*—Joseph Golian
*Attorney, Agent, or Firm*—Brumbaugh, Graves, Donohue & Raymond

[57] ABSTRACT

The present invention relates to a process for the preparation of a concentrated tea extract comprising the steps of:

(a) extracting tea-leaves with water having a temperature between 15° and 50° C. and separating the first extract from the tea-leaves;

(b) extracting tea-leaves which have previously been extracted with water between 15° and 50° C. for a second time, with water having a temperature of more than 50° C. and separating the second extract from the tea-leaves;

(c) concentrating said first extract to obtain a first concentrate;

(d) concentrating said second extract to obtain a second concentrate; and (e) combining said first and second concentrate, wherein said first extract is concentrated by subjecting it to reverse osmosis at a temperature between 20° and 50° C. and said second extract is concentrated between 50° and 100° C.

5 Claims, No Drawings

CONCENTRATED TEA EXTRACT

This application is a continuation of application Ser. No. 07/120,518, filed on Nov. 13, 1987, abandoned.

The present invention relates to a process for the preparation of a concentrated tea extract.

Concentrated tea extracts are commonly used as a base for the preparation of instant tea. A well-known method to prepare instant tea involves the freeze-drying of a frozen concentrated tea extract as described in EP 133 772.

The preparation of a concentrated tea extract usually involves an extraction step, wherein tea-leaves are extracted with water, followed by a concentration step wherein the solids content of the extract is increased.

Several attempts have previously been made to improve the quality of concentrated tea extracts by selecting the conditions for extraction and/or concentration.

GB 559 758 describes a two-stage extraction process wherein the tea is first extracted at ambient temperature, whereafter the first extract is separated from the tea-leaves and the extracted leaves are then extracted with hot water, whereafter both extracts are separately concentrated under vacuum and subsequently combined.

This method has the disadvantage that the quality of the two extracts is negatively affected during concentration. This quality deterioration can partly be explained by the fact that many volatile components are evaporated during concentration under vacuum conditions. Other reasons for quality loss can be the occurrence of chemical reactions and cream segregation.

A method for, minimizing the quality loss of a tea extract during concentration is proposed in EP 133 772. This method involves the subjection of a tea extract, obtained after extracting tea at an elevated temperature, to reverse osmosis at a lower temperature. However, this method has the disadvantage that it requires the addition of a stabilizer prior to concentration in order to prevent so-called cream formation.

The object of the present invention is to provide a process for the preparation of a concentrated tea extract of high quality, which does not require the use of chemical additives.

It was found that a concentrated tea extract can be obtained by a two-stage extraction step followed by a two-stage concentration step, wherein the concentration steps are carried out under special conditions.

Therefore, the present invention relates to a process for the preparation of a concentrated tea extract comprising the steps of:

(a) extracting tea-leaves with water having a temperature between 15° and 50° C. and separating the first extract from the tea-leaves;

(b) extracting tea-leaves which have previously been extracted with water between 15° and 50° C. for a second time, with water having a temperature of more than 50° C. and separating the second extract from the tea-leaves;

(c) concentrating said first extract to obtain a first concentrate;

(d) concentrating said second extract to obtain a second concentrate; and (e) combining said first and second wherein said first extract is concentrated by subjecting it to reverse osmosis at a temperature between 20° and 50° C. and said second extract is concentrated between 50° and 100° C.

The second extract is obtained by extracting with water having a temperature above 50° C., preferably above 60° C.

The treatment of the first extract by reverse osmosis at lower temperatures has the advantage that the loss of volatile components, aromates etc. can mainly be avoided and the occurrence of chemically destructive reactions can be minimized.

The concentration of the second extract can be carried out in any conventional manner, such as thermal concentration, etc., as long as the temperature is kept above 50° C., preferably between 50° and 100° C.

It was found, however, that the quality of the concentrated tea extract is optimal when the second extract is concentrated by subjecting it to reverse osmosis at a temperature between 50° and 100° C., preferably between 55° and 70° C.

Although the other conditions for reverse osmosis can vary within a broad range, best results are obtained when membranes which stop 99% NaCl are used. A suitable membrane is for instance PCI ZF 99. The pressure applied during reverse osmosis is preferably 30 to 60 bar.

The solids content of the first extract prior to concentration is preferably 1-6%, the solids content of the second extract 1-6%.

The concentration of the first extract is preferably carried out until the solids content is increased to 15-25%; the solids content of the second extract after concentration is also preferred to be from 15 to 25%. The extraction times and the ratio of tea to water during extraction can be varied according to the solids content of the extract which is wanted. Usual extraction times are 5 to 100 minutes; the weight ratio of tea to water usually lies between 1:5 and 1:30.

After concentration, the two concentrated fractions are combined. If desired, it is possible that the ratio of the two extracts in the final product is different from the original ratio in which the two extracts were obtained. It is also possible to combine two concentrated fractions which are each obtained from a different batch of tea-leaves which need not necessarily be of the same type.

The invention will be further illustrated by means of the following example.

EXAMPLE 12 kg of a standard black leaf tea are extracted with 150 liters of water in a recirculation column for 60 minutes at a temperature of 25° C. The extract is separated from the tea-leaves and has a solids content of 2 wt. %. The extracted tea-leaves are then further extracted with 120 liters of water at 70° C. for 30 minutes. The second extract is separated from the tea-leaves and has a solids content of 2 wt. %. The first extract is concentrated by subjecting it to reverse osmosis at a temperature of 35° C. and a pressure of 40 bar and by using a PCI ZF 99 membrane. The solids content of the concentrated extract is 20 wt. %. The second extract is concentrated by subjecting it to reverse osmosis at a temperature of 60° C. and a pressure of 40 bar and by using a PCI ZF 99 membrane. The solids content of the second concentrated extract is 20 wt. %. The two concentrated extracts are mixed and subsequently frozen and freeze-dried. One spoonful of the freeze-dried product is mixed with 200 ml hot water to give a tasty cup of tea of high quality.

I claim:

1. A process for the preparation of a concentrated tea extract comprising the steps of:
   (a) extracting tea-leaves with water having a temperature between 15° and 50° C. to form a first extract and separating the first extract from the tea-leaves;
   (b) extracting tea-leaves which have previously been extracted with water between 15° and 50° C. for a second time, with water having a temperature of more than 50° C. to form a second extract and separating the second extract from the tea-leaves;
   (c) concentrating said first extract by reverse osmosis at a temperature between 20° and 50° C. to obtain a first concentrate;
   (d) concentrating said second extract at a temperature between 50° and 100° C. to obtain a second concentrate; and
   (e) combining said first and second concentrates.

2. A process according to claim 1, wherein the second extract is concentrated by subjecting it to reverse osmosis at a temperature between 50° and 100° C.

3. A process according to claim 2, wherein the second extract is concentrated at a temperature between 55° and 70° C.

4. A process according to claim 1, wherein the reverse osmosis is carried out at a pressure of 30 to 60 bar.

5. A process according to claim 1, wherein the two concentration steps are carried out in the absence of chemical stabilizers that prevent cream formation.

* * * * *

UNITED STATES PATENT AND TRADEMARK OFFICE
CERTIFICATE OF CORRECTION

PATENT NO. : 5,198,259

DATED : March 30, 1993

INVENTOR(S) : Hoogstad

It is certified that error appears in the above-identified patent and that said Letters Patent is hereby corrected as shown below:

On the title page, item [57], under U.S. Patent Documents, the following cited reference should be listed:

2,235,700, 3/1941, Eldred et al.

On the title page, item [56], under Foreign Patent Documents, the following cited references should be listed:

67351, 8/1985, European Pat. Off.

110391, 2/1985, European Pat. off.

1284721, 9/1972 United Kingdom

Column 1, line 66 "second" should read --second concentrate--.

Signed and Sealed this

Thirteenth Day of September, 1994

Attest:

BRUCE LEHMAN

Attesting Officer     Commissioner of Patents and Trademarks